US009918188B2

(12) United States Patent
Ferrara et al.

(10) Patent No.: US 9,918,188 B2
(45) Date of Patent: *Mar. 13, 2018

(54) SYSTEMS AND METHODS FOR OPTIMIZING MESSAGE NOTIFICATION BASED ON GEOGRAPHIC LOCATION AND TIME

(71) Applicant: Oath Inc., Dulles, VA (US)

(72) Inventors: Peter Ferrara, Reston, VA (US); Bryce Barrand, Ashburn, VA (US)

(73) Assignee: Oath Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,507

(22) Filed: Jul. 21, 2017

(65) Prior Publication Data
US 2017/0325058 A1  Nov. 9, 2017

Related U.S. Application Data

(63) Continuation of application No. 14/219,554, filed on Mar. 19, 2014, now Pat. No. 9,749,781.

(51) Int. Cl.
*H04W 4/02* (2018.01)
*H04L 12/58* (2006.01)
(Continued)

(52) U.S. Cl.
CPC .............. *H04W 4/02* (2013.01); *H04L 51/14* (2013.01); *H04L 51/20* (2013.01); *H04L 67/26* (2013.01);
(Continued)

(58) Field of Classification Search
CPC ......... H04W 4/12; H04W 4/02; H04W 4/021; H04W 64/00; H04W 8/18; H04M 1/72572; H04M 2242/14; H04M 3/5335
See application file for complete search history.

(56) References Cited

U.S. PATENT DOCUMENTS

2006/0109857 A1   5/2006  Hermann
2011/0045841 A1   2/2011  Kuhlke et al.
(Continued)

OTHER PUBLICATIONS

International Search Report and Written Opinion issued in corresponding European Application No. 15159839.8, dated Jun. 10, 2015 (7 pages).

*Primary Examiner* — Charles Appiah
*Assistant Examiner* — Margaret G Mastrodonato
(74) *Attorney, Agent, or Firm* — Bookoff McAndrews, PLLC

(57) ABSTRACT

Systems and methods are provided for optimizing delivery of messages to mobile device users, the method comprising receiving a message to be sent to a client application executable at a mobile device of a user, along with an associated time constraint and an associated geographic constraint; determining a current time at the mobile device and a current geographic location of the mobile device via a communication network; determining, upon receiving the current geographic location of the mobile device and the current time of the mobile device, whether the current geographic location of the mobile device complies with the associated geographic constraint for the message to be sent to the client application and determining whether the current time of the mobile device complies with the associated time constraint for the message to be sent to the client application; and sending, when the current geographic location of the mobile device is determined to comply with the associated geographic constraint and when the current time of the mobile device is determined to comply with the associated time constraint, the message for display to the user at the mobile device via a message notification interface of an operating system of the mobile device.

20 Claims, 7 Drawing Sheets

(51) Int. Cl.
*H04L 29/08* (2006.01)
*H04W 8/18* (2009.01)
H04M 1/725 (2006.01)
H04W 4/12 (2009.01)
H04M 3/533 (2006.01)

(52) U.S. Cl.
CPC ............ *H04W 4/021* (2013.01); *H04W 8/18* (2013.01); *H04M 1/72572* (2013.01); *H04M 3/5335* (2013.01); *H04W 4/12* (2013.01)

(56) References Cited

U.S. PATENT DOCUMENTS

| | | |
|---|---|---|
| 2013/0143586 A1 | 6/2013 | Williams et al. |
| 2013/0159463 A1 | 6/2013 | Bentley et al. |
| 2013/0268353 A1 | 10/2013 | Zeto, III et al. |

SYSTEMS AND METHODS FOR OPTIMIZING MESSAGE NOTIFICATION BASED ON GEOGRAPHIC LOCATION AND TIME

CROSS-REFERENCE TO RELATED APPLICATION

This application is a continuation of and claims the benefit of priority to U.S. application Ser. No. 14/219,554, filed Mar. 19, 2014, which is incorporated herein by reference in its entirety.

TECHNICAL FIELD

The present disclosure relates generally to location- and time-based services for mobile device users and, more particularly, to providing messaging services to particular mobile device users based on their respective geographic locations and/or a time constraint.

BACKGROUND

Mobile devices, such as smartphones, now allow users to perform a variety of tasks that traditionally required different types of devices. For example, a user may be able to use different client applications executable at the same mobile device to browse online content, play audio files, capture digital images, view directions for navigating between different locations or points of interest, and exchange messages between other users or computing devices via a mobile communication network. A user may also download and install various third-party client applications at the user's mobile device for receiving messages, viewing information, and viewing content related to general topics of interest. An application developer or affiliated service provider may use such a client application to provide different services to the user. Such services may include messaging services through which users may correspond with themselves or each other through messages. Other messaging services may include subscription services in order to receive, for example, real-time message notifications or breaking news alerts at the user's mobile device. The message notifications or alerts that are sent (or "pushed") by a service provider for a particular client application may be displayed within a general notifications window via a user interface of the operating system at the user's mobile device, even though the client application may be closed or not be actively executing at the mobile device when such notifications are received.

Conventional solutions for delivering messages to a user's mobile device typically do not take into account the current location of the mobile device or the current time. Hence, the messages to the user's mobile device usually are delivered immediately when sent without regard to a particular time and/or to the user's current geographic location. Moreover, conventional solutions may not provide a way to deliver messages that are relevant to the user's current location at an appropriate time.

SUMMARY OF THE DISCLOSURE

Embodiments disclose systems and methods for timing message notifications so as to optimize the delivery of targeted content to mobile device users.

According to certain embodiments, methods are disclosed for optimizing delivery of messages to mobile device users. The method includes receiving a message to be sent to a client application executable at a mobile device of a user, along with an associated time constraint and an associated geographic constraint, and determining a current time at the mobile device and a current geographic location of the mobile device via a communication network. The method further comprises determining, upon receiving the current geographic location of the mobile device and the current time of the mobile device, whether the current geographic location of the mobile device complies with the associated geographic constraint for the message to be sent to the client application and determining whether the current time of the mobile device complies with the associated time constraint for the message to be sent to the client application and sending, when the current geographic location of the mobile device is determined to comply with the associated geographic constraint and when the current time of the mobile device is determined to comply with the associated time constraint, the message for display to the user at the mobile device via a message notification interface of an operating system of the mobile device.

According to certain embodiments, systems are disclosed for optimizing delivery of messages to mobile device users. One system includes a memory having processor-readable instructions stored therein and a processor configured to access the memory and execute the processor-readable instructions, which when executed by the processor configures the processor to perform a plurality of functions, including functions to: receive a message to be sent to a client application executable at a mobile device of a user, along with an associated time constraint and an associated geographic constraint; determine a current time at the mobile device and a current geographic location of the mobile device via a communication network; determine, upon receiving the current geographic location of the mobile device and the current time of the mobile device, whether the current geographic location of the mobile device complies with the associated geographic constraint for the message to be sent to the client application and determining whether the current time of the mobile device complies with the associated time constraint for the message to be sent to the client application; and send, when the current geographic location of the mobile device is determined to comply with the associated geographic constraint and when the current time of the mobile device is determined to comply with the associated time constraint, the message for display to the user at the mobile device via a message notification interface of an operating system of the mobile device.

According to certain embodiments, a computer readable medium is disclosed as storing instructions that, when executed by a computer, cause the computer to perform functions to: receive a message to be sent to a client application executable at a mobile device of a user, along with an associated time constraint and an associated geographic constraint; determine a current time at the mobile device and a current geographic location of the mobile device via a communication network; determine, upon receiving the current geographic location of the mobile device and the current time of the mobile device, whether the current geographic location of the mobile device complies with the associated geographic constraint for the message to be sent to the client application and determining whether the current time of the mobile device complies with the associated time constraint for the message to be sent to the client application; and send, when the current geographic location of the mobile device is determined to comply with the associated geographic constraint and when the current time of the mobile device is determined to comply with the associated time constraint, the message for display to the user at the mobile device via a message notification interface of an operating system of the mobile device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1:
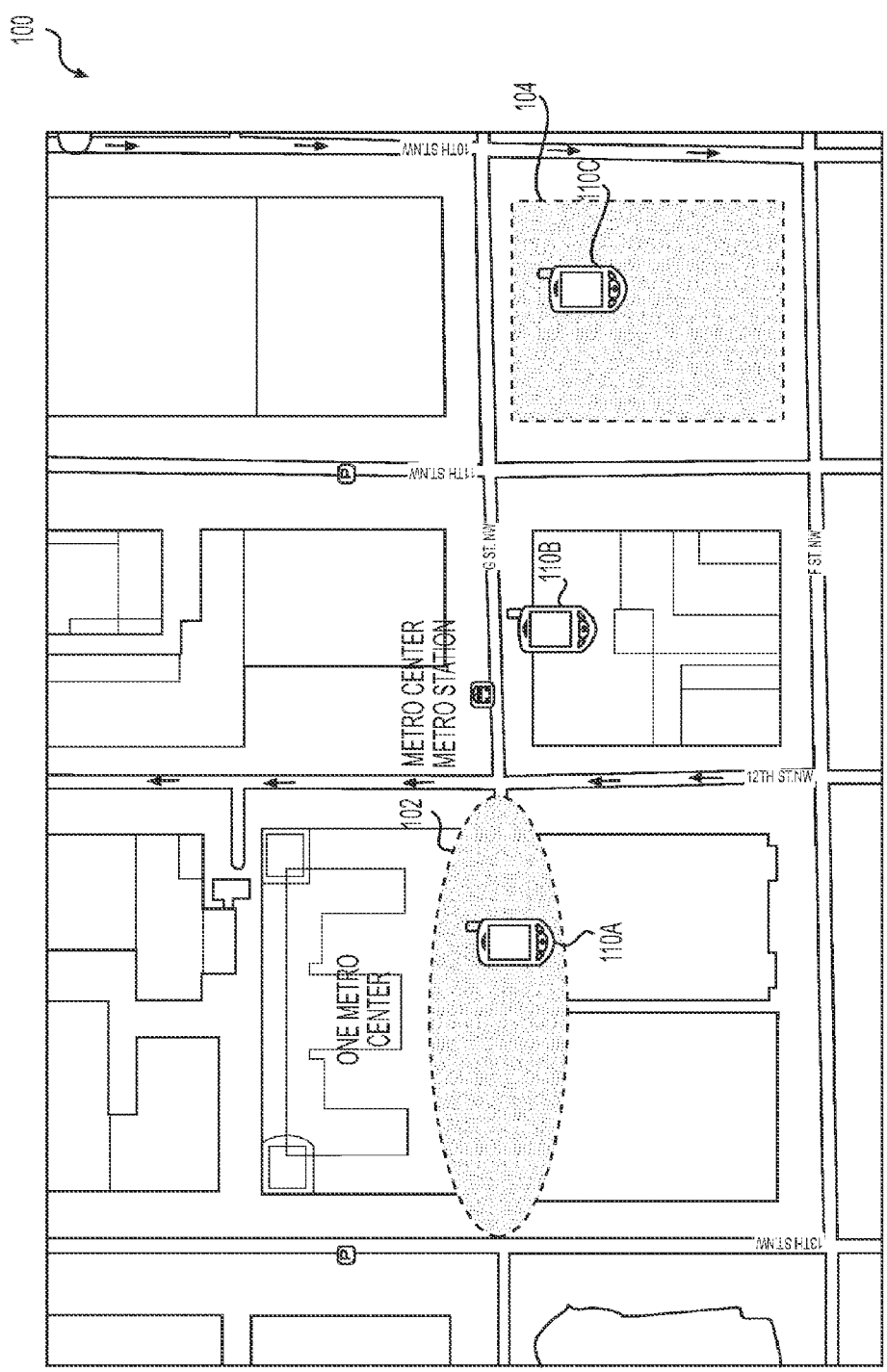
FIG. 1 is a view of a map showing multiple geo-fenced areas for providing messages to mobile device users that are determined to comply with a geographic constraint.

The present disclosure is directed to overcoming one or more of the above referenced issues. Specifically, the present disclosure is directed to optimizing delivery of messages to mobile device users. In order to optimize the delivery, the message may include an indication that provides a time-based criterion and a geographic-based criterion, both of which are satisfied before releasing a queued message to an intended recipient. The optimizations are to ensure a better chance that a user of the mobile device receives the message when and where the message is most needed and/or not to receive the message when it is not important or of less importance.

For example, one member of a household may notice that a particular household staple is almost gone. The member of the household may want to notify another member of the household to buy the particular household staple when the other member leaves work for the day by sending the other member a message. However, the member may not want to send the other member the message immediately because an immediate message may interrupt his or her work, and he or she may not remember the message by the end of the day to buy the particular household staple (i.e., the message is not relevant at the current time). Thus, the member may queue a message to the other member, by indicating that the message should be sent after a predetermined time, such as after work at 5 pm, or during a time period, such as 5 pm to 8 pm, when the milk is needed. The member may also want to indicate a geographic constraint on the message to ensure that the message is received when other member leaves his or her office. The geographic constraint may be indicated as an area outside of the other member's office and/or an area within a few miles of a market, which ensures that the other member has left work and/or is near a place that sells the particular household staple.

In another example, a user may want to queue a message that reminds him or her to silence his or her mobile phone when he or she enters a church on Sunday. Accordingly, the user may queue a message to silence his or her cell phone with a geographic constraint of an area within a church and a time constraint being any time on Sundays. The user may also want to queue a message that reminds him or her to silence his or her mobile phone whenever he or she enters a movie theatre. Thus, the user may queue a message to silence his or her cell phone with a geographic constraint of an area within a movie theatre and a time constraint being always.

In yet another example, a mother may want to queue a video message to her daughter when she gets home from school to let her know that she is out on an errand. Alternatively, the mother may want to queue a message to her daughter 2 hours after she gets home to remind her to do her homework. Thus, the mother may queue a message to her daughter with a geographic constraint of an area within the home and a time constraint of immediately and/or 2 hours later.

In another example of an embodiment, an application developer or affiliated information service provider, e.g., a news agency or other media outlet, associated with a client application may provide a mobile messaging service, to which the user may subscribe so as to authorize the service provider to send (e.g., "push") a message (e.g., breaking news or other alerts) to the user's device via a mobile communication network when the user is within a geographic location where the message is relevant (e.g., a storm warning near the user). The messages sent by a service provider associated with a client application executable at the user's device may be displayed within a general notifications window of a graphical user interface (GUI) of the device's operating system, even when the corresponding client application may not have been launched by the user or be actively executing at the mobile device.

In the above examples, the geographic constraint may be a predetermined geographic area of any size and shape. The bounds of the geographic area may be defined by, for example, a customized geo-fence or virtual perimeter surrounding or outside of a particular location or point of interest (POI) indicated by the message. Accordingly, the delivery of the message, which may be relevant to a POI located near the user's current geographic location, may be triggered when the location of the user's mobile device is determined to comply with the geographic constraint. More specifically, the message may be relevant when the user is determined to be within the corresponding geo-fenced area (i.e., the user has entered the geo-fence). Alternatively, the message may be relevant when the user is determined to be outside the corresponding geo-fenced area (i.e., the user has exited the geo-fence).

The time constraint may indicate a predetermined time and/or a predetermined time period. The bounds of the time constraint may be defined by, for example, after a predetermined time, before a predetermined time, within a predetermined time period, outside of a predetermined time period, or at all times.

Examples of time constraints may include predetermined time, predetermined days, predetermined days of the week or weekend, a predetermined month, and/or any known measure or period of time and dates. Accordingly, the delivery of a message, which may be relevant to a current time in which a user is currently located, may be triggered when the time according to the user's mobile device is determined to comply with the time constraint.

The messages are typically displayed within a designated portion of the client application's own GUI as it executes at the user's device, e.g., a pop-up, in a messaging application, or as a banner presented in a bottom or top portion of the application's GUI (e.g., of a mobile browser) as it is displayed on a display screen of the user's device. The messages may be delivered to the user's device whenever the user's mobile device is turned on or the messages may be delivered only when the client application is actively executing at the device, e.g., after the user has manually launched the application for execution via a user interface of the operating system at the mobile device.

When the messages are coming from a third-party content provider, such as breaking news alerts relevant to the current user's location, the user who has subscribed to messaging services offered by a service provider associated with a client application executable at the user's device may or may not have authorized the application service provider to send general messages (e.g., push notifications) related to topics of interest to the user's device. It may also be assumed for purposes of this example that the user has at least implicitly requested or authorized third-party content providers (e.g., with whom the application service provider may have entered into a partnership agreement) to deliver messages to the user's mobile device within a designated portion of the application's GUI while the client application is actively executing at the user's device (e.g., pursuant to terms and conditions of use accepted by the user).

Reference will now be made in detail to the exemplary embodiments of the disclosure, examples of which are illustrated in the accompanying drawings. Wherever possible, the same reference numbers will be used throughout the drawings to refer to the same or like parts.

FIG. 1 is a view of a map 100 showing multiple geo-fenced areas for providing messages to mobile device users determined to be located within a geo-fenced area or outside of a geo-fenced area. As shown in FIG. 1, map 100 includes a geo-fenced area 102 and a geo-fenced area 104. Each of geo-fenced areas 102 and 104 may be associated with a mobile device. In an example, geo-fenced areas 102 and 104 may each correspond to the location of a venue, public landmark, commercial business (e.g., a restaurant, office, store, etc.), or other POI. Alternatively, the geo-fenced areas 102 and 104 may be inputted by one or more users and represent a targeted geographic area of interest. Thus, the boundaries or dimensions of each of the geo-fenced areas 102 and 104 may correspond to, for example, the shape and size of a building or other physical structure associated with the organization (e.g., a restaurant, office, store, or other place of business). Additionally, it should be noted that geo-fenced areas 102 or 104 may be of any size and shape, as desired for a particular implementation. For example, the size and shape of each geo-fenced area may be based on a predetermined radius around a specified location, address, or POI.

Also, as shown in FIG. 1, map 100 indicates the geographic locations of a user device 110a, a user device 110b, and a user device 110c. Each of user devices 110a, 110b, and 110c may be implemented using, for example, any type of mobile computing device including, but not limited to, a laptop computer, tablet computer, mobile handset, smartphone, personal digital assistant (PDA), a dedicated portable Global Positioning System (GPS) navigation device, or similar type of mobile device. Further, each of user devices 110a, 110b, and 110c may be equipped with a GPS receiver for registering GPS location data, e.g., latitude and longitude coordinates, at a particular point or over a period of time. However, it should be noted that the physical or geographic location of each of user devices 110a, 110b, and 110c may be determined or estimated using any one or a combination of various well-known techniques for deriving such geographic location information. Examples of such techniques include, but are not limited to, GPS, cell identification (e.g., using Cell ID), cellular tower triangulation, multilateration, Wi-Fi, and any other network- or handset-based technique for deriving or estimating the physical or geographic location of a mobile device via a mobile communication network.

It should be noted that the physical or geographic location of each of user devices 110a, 110b, and 110c may be used to determine or estimate a current time for each of the respective devices using any one or a combination of various well-known techniques for deriving such time information, such as a world clock.

Each of user devices 110a, 110b, and 110c may be configured to receive messages, send messages, and/or to execute one or more client applications. Such a client application executable at each of user devices 110a, 110b, and 110c may be associated with, for example, an information service provider or a messaging application. Further, each of user devices 110a, 110b, and 110c may be configured to receive messages from the mobile user or other users, or messages related to topics of interest (e.g., breaking news alerts) for a user at each device. As will be described in further detail below, such notifications may be sent to each of user devices 110a, 110b, and 110c by a message server via a mobile communications network. The messages may be sent by the message server as, for example, push notifications that are periodically sent to each device. However, it should be noted that the techniques disclosed herein are not limited to push notifications and that these techniques may be applied with any type of messaging scheme or protocol used to deliver messages to user devices 110a, 110b, and 110c. For example, any of user devices 110a, 110b, or 110c may be configured to request (or "pull") pending messages from the message server via the mobile communication network.

Each of user devices 110a, 110b, and 110c may be configured to send messages to each of the other user devices and or their own user device. For example, user device 110a may send a message along with a geographic constraint and a time constraint to the user device 110b, the user device 110c, both the user devices 110b and 110c, their own user device 110a, and/or all of the user devices 110a, 110b, and 110c.

As described above, the messages delivered to any of user devices 110a, 110b, or 110c for a particular client application, such as a messaging application, executable at the device may be displayed within, for example, a general notifications window or similar type of user control element of a GUI provided by a mobile operating system at the device, particularly when the client application has not been opened or launched by the user and thus, the client application is not actively executing at the user's device. The client application may be configured to always be opened or launched in the background of the user device. Further, the client application may be configured to allow the user device to only receive messages from only certain users. For example, the client application on user device 110a may be configured to only receive messages, along with a geographic constraint and time constraint, from users or members within his or her social network and/or a contact of the user of the user device 110a. In other words, the client application on user device 110a may be configured to "opt-in" to receive messages from only particular social networks, contacts, users, and/or other services that send messages. Alternatively, the client application on user device 110a may be configured to "opt-out" from receiving messages from certain social networks, contacts, users, and/or other services that send messages.

As described above, each of user devices 110a, 110b, and 110c may be configured to allow or disallow messages from certain social networks, contacts, users, and/or other services that send messages as specified in each of the respective user devices. For example, the user device 110a may be configured to only allow messages with associated geographic constraints and time constraints from a contact list of user device 110a. In an embodiment, the contacts and/or users that are allowed to send messages to user device 110a may be allowed to access the current geographic location of user device 110a. If the contacts and/or users of the user device 110a are able to access the current geographic location of user device 110a, they are able to set up geo-fences around or nearby user device 110a. In this way, user device 110a is more likely to comply with the geographic constraints that are set up by the contacts and/or users.

A GUI of a client application that is capable of sending messages, along with the geographic constraint and the time constraint, may include a map, such as map 100 as shown in FIG. 1, that allows a user of the client application to set the predetermined geographic area associated with the message. For example, a user sending a message may set a geo-fence around a location on the map 100, such as the geo-fenced area 104. Alternatively, the user may set a geo-fenced area around a user, such as the geo-fenced area 102 which is around user device 110a. Thus, when user device 110a leaves the geo-fenced area, a message may be sent to user device 110a. In one embodiment, a user of the client application may be able to see the current locations of various user devices of users that are in his or her social network and/or contacts. Accordingly, the user is able to set geo-fenced areas around the current locations of the various user devices, and thus, be able to set geographic constraints that are relevant to the various user devices.

As described above, the user of each device may have subscribed to a service offered by an application service provider associated with a client application executable at the user's device, which authorizes the application service provider to send relevant messages (e.g., as push notifications) to the user's device.

A message associated with geo-fenced area 102 may be provided to user device 110a via a mobile communication network, when the geographic location of mobile device 110a is determined to be within or outside of geo-fenced area 102. Similarly, a message associated with geo-fenced area 104 may be provided to an appropriate client application executing at user device 110c, when user device 110c is determined to be within or outside of geo-fenced area 104. However, as described above, in some cases, the messages may be provided to each of user devices 110a and 110c only when the appropriate client application in this example is actively executing at each of user devices 110a and 110c.

In an example, a user of a client application executable at user device 110b may have subscribed to a messaging service provided by an application service provider associated with the client application in order to receive push notifications related to topics or events of interest to the user. Such a messaging service may be hosted at a message server associated with the client application or application service provider. Additional details of such a message server will be described in further detail below in reference to FIGS. 2-4. Examples of different push notifications that may be sent for the user at user device 110b include, but are not limited to, messages inputted by the user of the mobile device, messages from other users, news alerts related to topics or keywords previously specified by the user, system or service-related message notifications, public safety advisories, and notifications of comments or messages posted to an electronic message board by other users (e.g., members of a social networking group associated with the user of user device 110b). The push notifications may be periodically sent by, for example, a messaging service of the application service provider to user device 110b via a mobile communication network. The notifications received at user device 110b may be displayed in a general notifications window of a GUI provided by the operating system of user device 110b.

As indicated by map 100, the current geographic location of user device 110b in this example is outside of a designated geographic area, e.g., corresponding to either of geo-fenced areas 102 or 104. Thus, upon determining that user device 110b does not currently comply with the geographic constraint, the above-described messaging service provided by the application service provider may add a new message, to be sent (or pushed) as a notification to user device 110b, to a message queue maintained by the message server. As will be described in further detail below, the determination of whether or not a particular geographic location complies with a geographic constraint may be made by a server associated with a service provider based on the current geographic location of user device 110b. The current location of user device 110b may be forwarded to the server by an application server or message server associated with the application service provider In some implementations, a message or message notification that may be added to the message queue may be associated with a time constraint. The time constraint may be as described above or may be an expiration time that may be used to determine the period of time that the message will be kept in the queue before being delivered to user device 110b, regardless of the device's current geographic location. The expiration time associated with a queued message may be based on, for example, a predetermined time period that reflects a priority level assigned to the particular message notification. For example, an important public advisory message or breaking news alert may be assigned a relatively high priority level, and therefore, be associated with a relatively short expiration time. Thus, such high priority message notifications may be kept in the queue for a relatively short time period or alternatively, be sent immediately to user device 110b, without being added to the message queue.

In the above example, user device 110b may be configured to periodically report its current geographic location and current time to the application or message server as this location changes over a period of time. As will be described in further detail below, upon receiving an indication of a new or updated current geographic location of user device 110b, the message server may query the appropriate server to determine whether the updated geographic location complies with the geographic constraint. It should be noted that this determination may be made by the application server or message server itself, e.g., based on stored information identifying the locations and boundaries of various geographic constraints. It should also be noted that the application server or message server may communicate with multiple third-party servers, which may be associated with different third-party providers, via an electronic communication network, as will be described in further detail below.

If it is determined that the updated geographic location of user device 110b complies with the geographic constraint, e.g., within or outside of geo-fenced area 102 or geo-fenced area 104, the message server may check the message queue for any previously queued messages. The message server may then request an updated time of user device 110b, and then determine whether the updated time of the user device 110b complies with the time constraint. After confirming that both the geographic constraint and time constraint are complied with, the server may then send a message notification from the message queue to user device 110b. In an alternative embodiment, the message server may check the time constraint before the geographic constraint, or the message server may check both the time constraint and geographic constraint concurrently.

Figure 2:
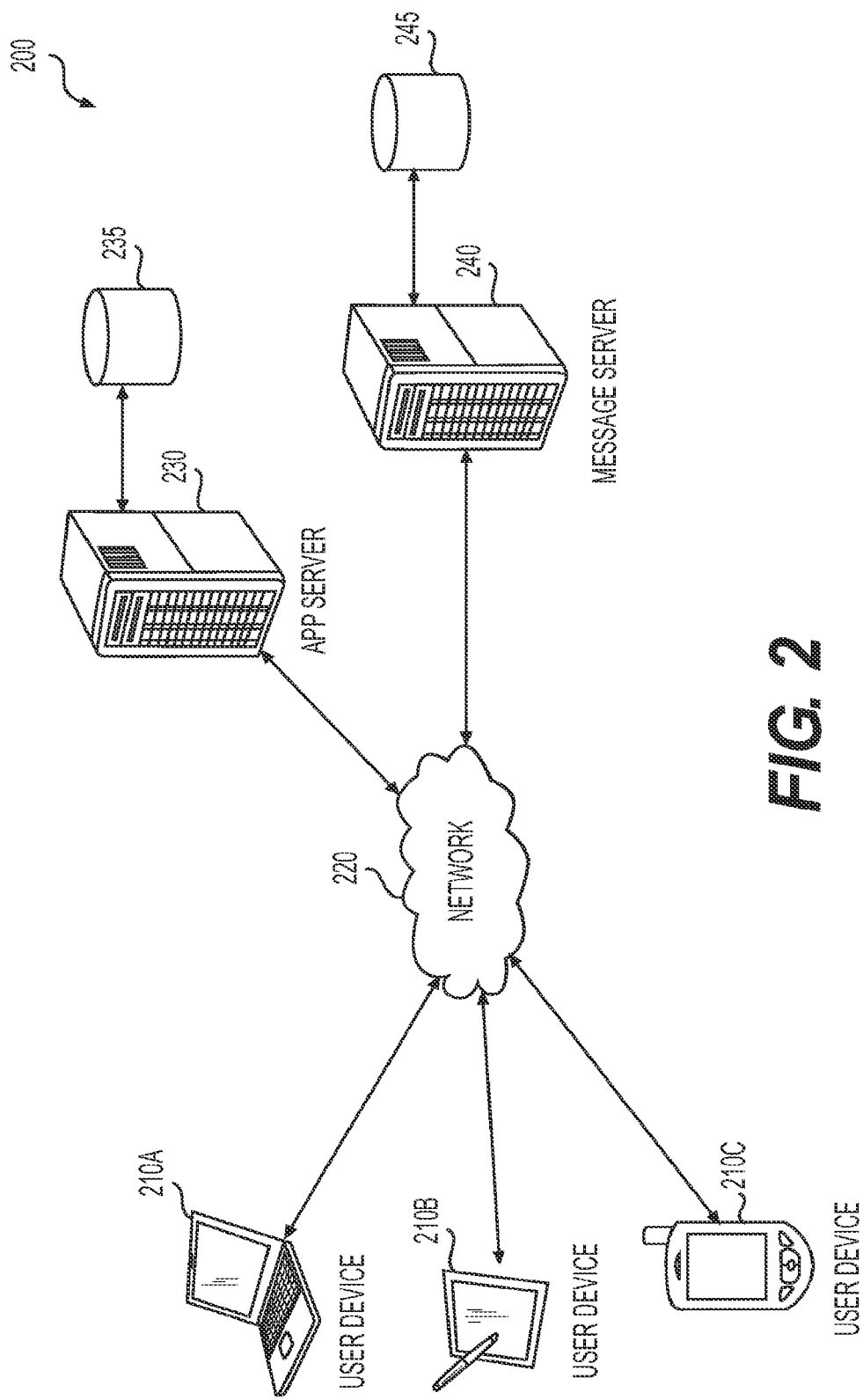
FIG. 2 is a block diagram of an exemplary communication system suitable for practicing an embodiment of the present disclosure.

FIG. 2 is a block diagram of an exemplary communication system 200 for practicing embodiments of the present disclosure. As shown in FIG. 2, system 200 includes user devices 210a, 210b, and 210c, an application server 230 coupled to a database 235 and a message server 250 coupled to a database 255, all of which may be communicatively coupled via an electronic communication network 220.

Network 220 may be any type of electronic network or combination of networks used for communicating digital content and data between various computing devices. Network 220 may include, for example, a local area network, a medium area network, or a wide area network, such as the Internet. While only user devices 210a, 210b, and 210c are shown in FIG. 2, system 200 may include any number of user devices. Similarly, while only application server 230 and message server 240 are shown in FIG. 2, it should be understood that system 200 may include additional or fewer servers, as desired for a particular implementation. Further, while not shown in FIG. 2, network 220 may include various switches, routers, gateways, or other types of network devices used to facilitate communication between various computing devices via network 220.

In the example shown in FIG. 2, user device 210a may be a laptop, notebook, netbook, or similar type of mobile computing device. User device 210b may be, for example, a tablet device or similar type of mobile device having a touchscreen display. User device 210c may be, for example, a mobile handset, smartphone, or personal digital assistant ("PDA"). However, it should be noted that each of user devices 210a, 210b, and 210c may be any type of mobile computing device configured to send and receive different types of data including, but not limited to, website data, multimedia content, electronic advertisements, and any other type of digital information, over network 220. Examples of such mobile computing devices include, but are not limited to, a laptop computer, a handheld computer, a personal digital assistant (PDA), a cellular telephone, a network appliance, a camera, a smart phone, an enhanced general packet radio service (EGPRS) mobile phone, a media player, a navigation device, a portable game console, or any combination of these computing devices or other types of mobile computing devices having at least one processor, a local memory, a display, one or more user input devices, and a network communication interface. The user input device(s) may include any type or combination of input/output devices, such as a display monitor, touchpad, touchscreen, microphone, camera, keyboard, and/or mouse.

Each of application server 230 and message server 240 may be any of various types of servers including, but not limited to, a web server, a proxy server, a network server, or other type of server configured to exchange electronic information with other servers or computing devices via a communication network, e.g., network 220. Such a server may be implemented using any general-purpose computer capable of serving data to other computing devices including, but not limited to, user devices 210a, 210b, and 210c or any other computing device (not shown) via network 220. Such a server may include, for example and without limitation, a processor and memory for executing and storing processor-readable instructions. The memory may include any type of random access memory (RAM) or read-only memory (ROM) embodied in a physical storage medium, such as magnetic storage including floppy disk, hard disk, or magnetic tape; semiconductor storage such as solid state disk (SSD) or flash memory; optical disc storage; or magneto-optical disc storage. Software may include one or more applications and an operating system. Hardware can include, but is not limited to, a processor, memory and graphical user interface display. The server may also be implemented using multiple processors and multiple shared or separate memory devices within, for example, a clustered computing environment or server farm.

Also, as shown in FIG. 2, application server 230 and message server 240 are communicatively coupled to databases 235 and 245, respectively. Each of databases 235 and 245 may be a data store or memory accessible to the corresponding server and may be implemented using any type of data storage device or recording medium used to store various kinds of data or content. Such data or content may include, for example and without limitation, text or media content that may be later provided to each of user devices 210a, 210b, and 210c via network 220.

In an example, each of user devices 210a, 210b, and 210c may execute a client application that communicates with application server 230 and/or message server 240 via network 220. Further, each of user devices 210a, 210b and 210c may be configured to receive application content through an interface provided by application server 230 via network 220. The content provided by application server 230 may be based on, for example, user requests initiated via a GUI of the client application executable at each device. The GUI of the client application executable at each of user devices 210a, 210b, and 210c may be configured to present the content to a user at each device via a display of the respective user devices 210a, 210b, and 210c. The GUI of the client application may include, for example, various control elements enabling the user to request various types of content, e.g., which may be associated with a web site maintained by the application service provider. Further, a portion of the GUI of the client application may serve as a message view area used to display messages from another user and/or the user. Such a content view of the client application may be a dedicated content area, e.g., displayed at the very top or bottom portion, of the application's GUI. Messages may be displayed within the content view of the client application when the client application is actively executing at user device 210a, 210b, or 210c. Also, as described above, the messages sent by an application provider for display to the user via a general message notifications interface of the operating system at user device 210a, 210b, or 210c, even when the client application is dormant or not actively executing at the particular device.

Application server 230 may be configured to host a web service that provides users various types of functionality via a GUI of the client application executable at each of user devices 210a, 210b and 210c. Such functionality may include, for example and without limitation, providing digital content distributed by an application service provider associated with the client application. The application service provider may be, for example, an online content provider, including those associated with various search engines, e-mail programs, RSS feed providers, magazines, e-zines, blogs, or any other online site or program that publishes or distributes online content related to, for example, news or various topics of general public interest. As described above, a functionality provided by such an application service provider may include sending messages, e.g., push notifications, related to topics of interest, as specified by a user/subscriber of each user device and may include messages sent from other users. Also, as described above, the messages sent to each device may be displayed for the user via a message notifications interface of a mobile operating system at each of user devices 210a, 210b, and 210c if, for example, the client application has not been launched by the user or is not actively executing at the user's device.

Further, application server 230 and message server 240 may be configured to communicate with one or more other third-party content servers (not shown) to retrieve content (e.g., electronic advertisements) via network 220 to be displayed within a content view of a client application executable at each of user devices 210a, 210b, and 210c. Further, application server 230 and message server 240 may each interact with one another, user devices 210a, 210b, or 210c, or any other servers or network devices (not shown) via network 220. Examples of such other servers include, but are not limited to, DNS servers, ad servers, and content distribution servers.

Message server 240 in this example may be configured to control the sending of messages or push notifications to be sent via network 220 to each of user devices 210a, 210b, and 210c based on the current geographic location of each device relative to one or more geographic constraints, e.g., geo-fenced areas 102 and 104, and/or time constraints for delivering the messages to a user at each device as described above. In an example, message server 240 may delay the sending of a message when the current geographic location of the device is determined not to comply with the geographic constraint and/or when the current time of the device is determined not to comply with the time constraint. As will be described in further detail below, message server 240 may add the message to a message queue for the client application. Message server 240 may be configured to send the message from the message queue to user device 210a, 210b, or 210c via network 220, upon receiving an indication of an updated current geographic location of the device and updated current time of the device and determining that the new or updated location complies with the geographic constraint and/or determining that the updated time complies with the time constraint.

In an example, message server 240 may determine whether or not the current geographic location of user device 210a, 210b, or 210c complies with the geographic constraint, as described above and as will be described in further detail below. Message server 240 may be configured to receive a request including the current geographic location of user device 210a, 210b, or 210c and send an appropriate response to user device 210a, 210b, or 210c after determining whether the received geographic location complies with the geographic constraint. The geographic constraint may be one of a plurality of different areas corresponding to various predetermined geographic areas for providing the message to mobile device users when each user's mobile device is determined to comply with the geographic constraint. As described above, the message delivered to a user's device may be relevant to a particular location or POI associated with the geographic area. Further, the delivery of such message may be triggered when the user's mobile device is detected within the boundary of a geo-fence corresponding to the geographic area or is detected outside of the boundary of a geo-fence corresponding to the geographic area.

In another example, message server 240 may determine whether or not the current time of user device 210a, 210b, or 210c complies with the time constraint, as described above and as will be described in further detail below. Message server 240 may be configured to receive a request including the current time of user device 210a, 210b, or 210c and send an appropriate response to user device 210a, 210b, or 210c after determining whether the received time complies with the time constraint. The time constraint may be one of a plurality of different timings corresponding to various predetermined times or time periods for providing the message to mobile device users when each user's mobile device is determined to comply with the time constraint. As described above, the message delivered to a user's device may be relevant to a particular time or period of time. Further, the delivery of such message may be triggered when the user's mobile device is detected within the boundary of a time constraint or is detected outside of the boundary of a time constraint. As described above, the bounds of the time constraint may be defined by, for example, after a predetermined time, before a predetermined time, within a predetermined time period, outside of a predetermined time period, or at all times.

In an alternative embodiment, the message server 240 may check the time constraint before the geographic constraint, or the message server may check both the time constraint and geographic constraint concurrently.

In some implementations, message server 240 may be implemented as a back-end component that interfaces with only application server 230. Thus, it should be noted that for some implementations, message server 240 may be configured to act only with application server 230, without any direct communication with any of user devices 210a, 210b, or 210c, in order to facilitate the message notification timing functionality described herein. Accordingly, application server 230 and message server 240 may be configured to exchange information in the form of messages, requests, or responses that are passed between the servers. The communication between application server 230 and message server 240 may be over network 220 or a virtual private network accessible to each server. In an example, messages added to the message queue may be routed from message server 240 to application server 230, when it is determined that user device 210a, 210b, or 210c complies with the geographic constraint. Application server 230 may then send the routed message to user device 210a, 210b, or 210c via network 220. However, it should be noted that the functions performed by application server 230 and message server 240 or a combination thereof, as described herein, may be implemented using a single server. Additional features and characteristics of the communication between user devices 210a, 210b, and 210c, application server 230 and message server 240 will be described in further detail below with respect to FIGS. 3 and 4.

Figure 3:
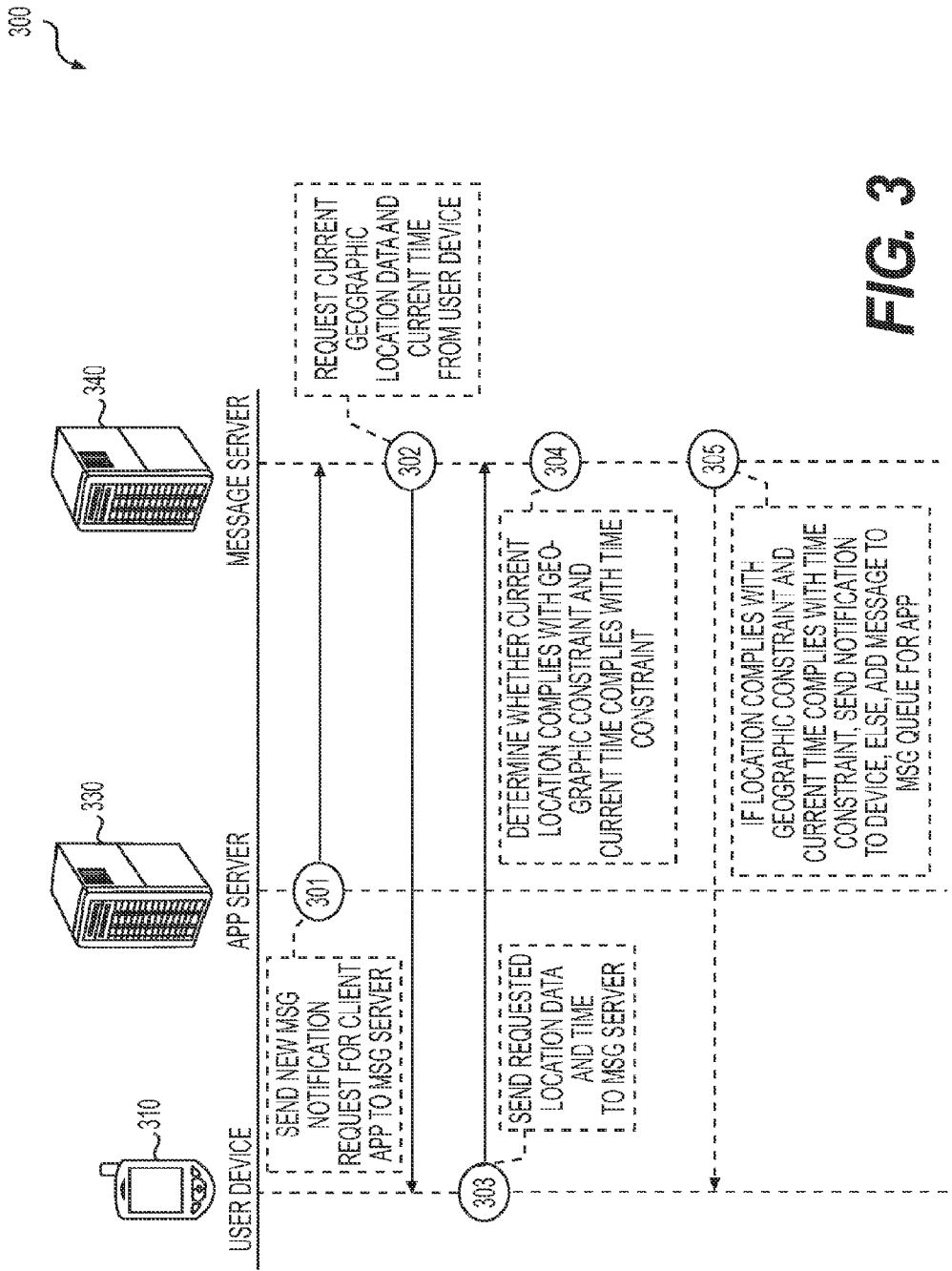
FIG. 3 is a communication flow diagram of an exemplary process for optimizing the timing of message notifications for a mobile device user based on a current geographic location and a current time of the user's device.

FIG. 3 is a communication flow diagram of an exemplary process 300 for optimizing the timing of message notifications for a mobile device user based on a current geographic location of the user's device relative to a geographic constraint and based on a current time at or of the user's device relative to a time constraint, as described above. The example shown in FIG. 3 illustrates the communication flow between a user device 310, an application server 330, and a message server 340. For purposes of discussion, process 300 will be described using map 100 of FIG. 1 and system 200 of FIG. 2, as described above, but process 300 is not intended to be limited thereto. Thus, user device 310 may be implemented using, for example, any of user devices 210a, 210b, or 210c of FIG. 2, as described above. Similarly, application server 330 and message server 340 may be implemented using, for example, application server 230 and message server 240, respectively, as described above.

As shown in FIG. 3, application server 330 may send a new message notification request for a client application executable at user device 310 to message server 340 via a communication network, e.g., network 220 of FIG. 2, as described above (step 301). Message server 340 may in turn request a current geographic location of user device 310 and a current time at or of user device 310 (step 302). Alternatively, the current time can be determined by the current location of the user device 310 and a world clock. The request may be sent by message server 340 directly to user device 310, as shown in FIG. 3, or alternatively, message server 340 may send the request to application server 330, which may then request the geographic location information and the time information from user device 310, if necessary. In some implementations, application server 330 may respond to the request from message server 340 by sending a last known or previously determined or estimated geographic location and/or time of user device 310, e.g., which may be stored in a memory or data store (e.g., database 235 of FIG. 2, as described above) coupled to application server 330. Accordingly, user device 310 may send the requested location data (or current geographic location information) and the time information to message server 340 (step 303), or to whichever server (e.g., application server 330) may have requested the information from user device 310.

Message server 340 may determine whether or not the current geographic location of user device 310 complies with the geographic constraint and whether or not the current time of user device 310 complies with the time constraint, as described above (step 304). The geographic constraint may correspond to, for example, a predetermined geographic area bounded by a virtual perimeter of a geofence, as described above, and the time constraint may correspond to the above described time boundaries. For example, the geographic constraint may be one of many areas corresponding to different geo-fenced areas, e.g., geo-fenced areas 102 and 104 of FIG. 1, as described above. The geographic constraint may be, for example, the detecting of leaving a boundary, e.g., crossing a boundary in a direction of inside a geo-fenced area to outside the geo-fenced area or crossing a boundary in a direction of outside a geo-fenced area to inside the geo-fenced area. If the current geographic location of user device 310 is determined to comply with the geographic constraint and/or the current time of user device 310 is determined to comply with the time constraint, message server 340 may send the message notification to user device 310 for display to the user at user device 310 via a general notifications interface of the operating system of user device 310, as described previously (step 305). Alternatively, if the device's location is determined not to comply with the geographic constraint and/or the current time is determined not to comply with the time constraint, the message may be added to a message queue to be sent at a later time, as described above.

Figure 4:
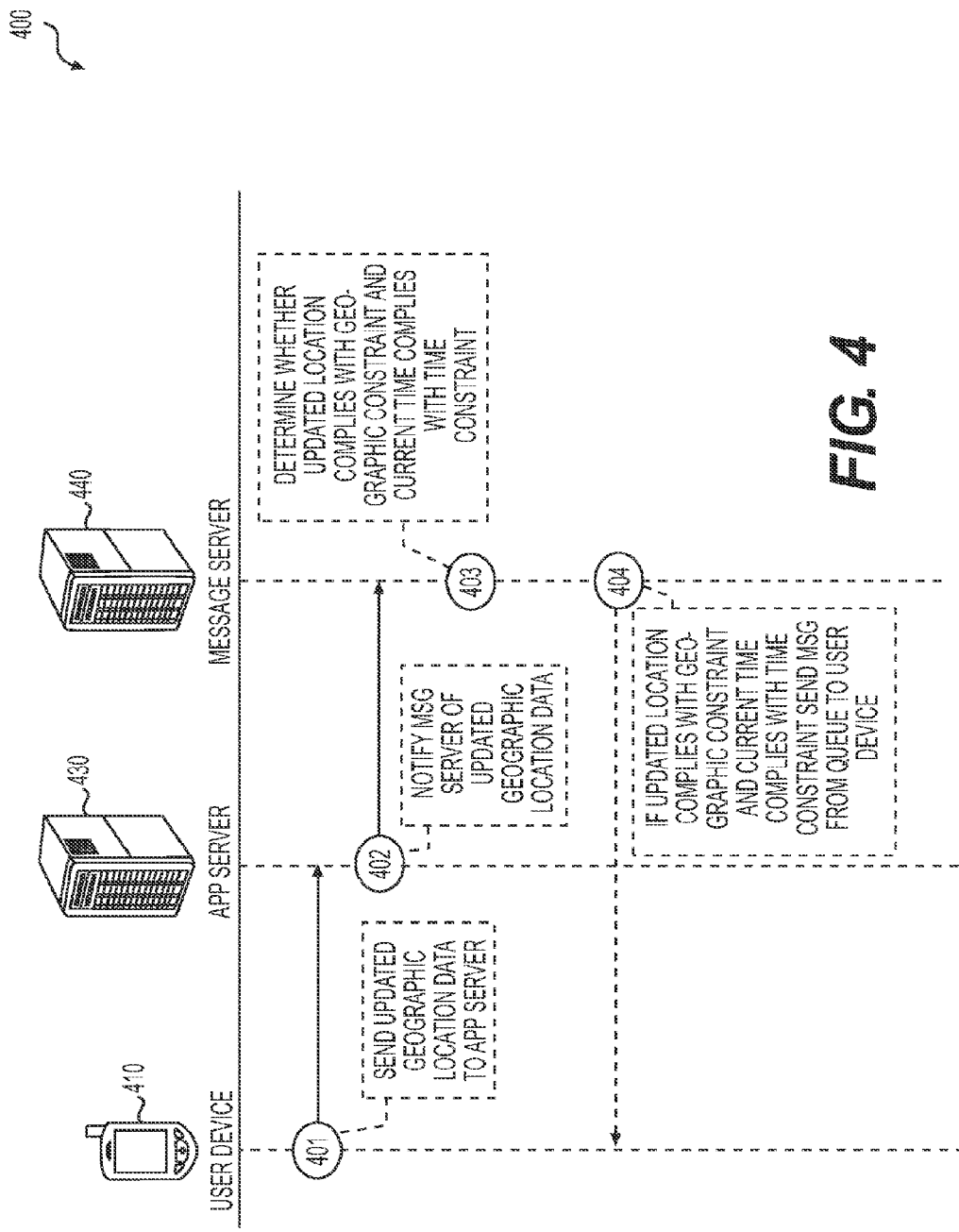
FIG. 4 is a communication flow diagram of an exemplary process for optimizing the timing of message notifications for the mobile device user of FIG. 3 based on a detected change in the current geographic location and a change in time of the user's device.

FIG. 4 is a communication flow diagram of an exemplary process 400 for optimizing the timing of message notifications for the user of mobile device 310 of FIG. 3, as described above, based on a detected change in the current geographic location of the user's device relative to the geographic constraint and/or based on a change in the current time of the user's device relative to the time constraint. As shown in FIG. 4, the detected change in location may be based on, for example, an updated current geographic location sent by user device 310 or an operating system thereof to application server 330 via a network, e.g., network 220 of FIG. 2, as described above. The change in time may be based on, for example, an updated time sent by user device 310, an operating system thereof to application server 330, and/or by determining the current time by extrapolating the time from the geographic information and a known time via a network, e.g., network 220 of FIG. 2, as described above (step 401).

Application server 330 may then notify message server 340 of the updated geographic location information and updated time information received from user device 310 (step 402). In response to the notification from application server 330, message server 340 may determine whether the updated current location and updated time of user device 310 complies with the geographic constraint and the time constraint, respectively (step 403). If the determination indicates that the updated location complies with the geographic constraint and the updated time information complies with the time constraint, message server 340 may check a message queue associated with the particular client application executable at user device 310 to determine if there are any pending message notifications within the queue that need to be sent to user device 310, e.g., as added previously by message server 340 (at step 305 of process 300 of FIG. 3, as described above). Message server 340 may send the message to user device 310 via a communication network, e.g., network 220 of FIG. 2 (step 404), only if a message is found within the message queue or do nothing otherwise.

Figure 5:
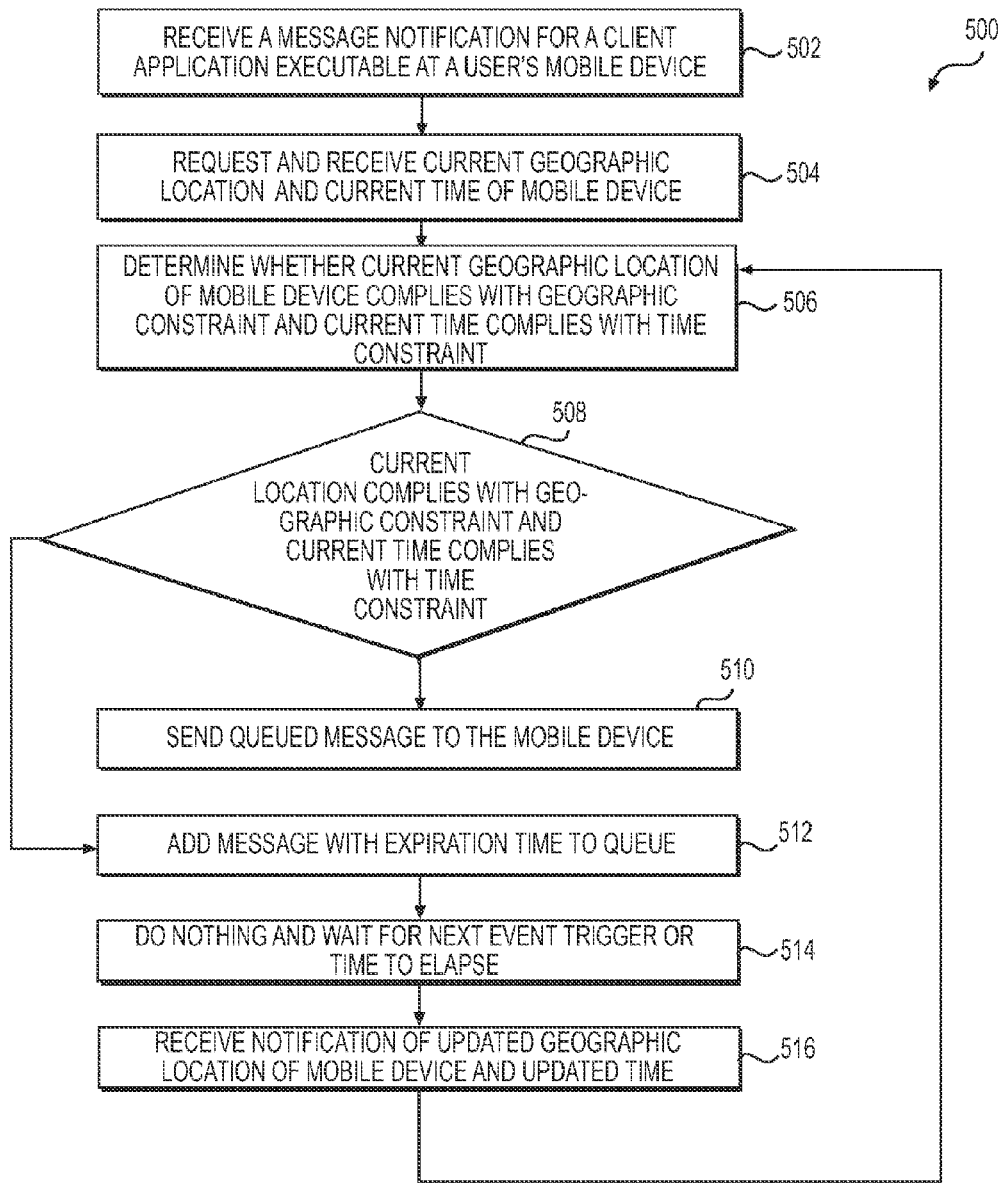
FIG. 5 is a process flow diagram of an exemplary method for optimizing the timing of message notifications for a mobile device user based on a current geographic location and a current time of the user's device.

FIG. 5 is a process flow diagram of an exemplary method 500 for optimizing the timing of message notifications for a mobile device user based on a current geographic location of the user's device relative to a geographic constraint and based on a current time of the user's device relative to a time constraint. For purposes of discussion, method 500 will be described using system 200 of FIG. 2 and the components of processes 300 and 400 of FIGS. 3 and 4 (including application server 330 and message server 340), as described above, but method 500 is not intended to be limited thereto. As shown in FIG. 5, method 500 includes steps 502, 504, 506, 508, 510, 512, 514, and 516. However, it should be noted that method 500 may include more or fewer steps as desired for a particular implementation. In an example, one or more of the above-listed steps of method 500 may be executed by message server 240 of FIG. 2 or message server 340 of FIGS. 3 and 4, as described above. However, method 500 is not intended to be limited thereto, and the steps of method 500 may be performed by any server (e.g., application server 230 of FIG. 2 or application server 330 of FIGS. 3 and 4) or other type of computing device having at least one processor, a memory, and a network communication interface for sending and receiving information from one or more user devices.

Method 500 begins in step 502, which includes receiving a message for a client application executable at a user's mobile device (e.g., user device 210 of FIG. 2 or user device 310 of FIGS. 3 and 4, as described above). The message may include a geographic constraint and/or a time constraint, as described above.

In step 504, a current geographic location of the mobile device and a current time of the mobile device are requested and received from the mobile device.

Steps 506 and 508 may include, for example, determining whether a current geographic location of the mobile device complies with a geographic constraint and whether a current time of the mobile device complies with a time constraint. If it is determined in step 508 that the current geographic location of the mobile device complies with the geographic constraint and the current time of the mobile device complies with the time constraint, method 500 may proceed to step 510, which includes sending a message from a message queue to the mobile device, and ends.

Figure 6:
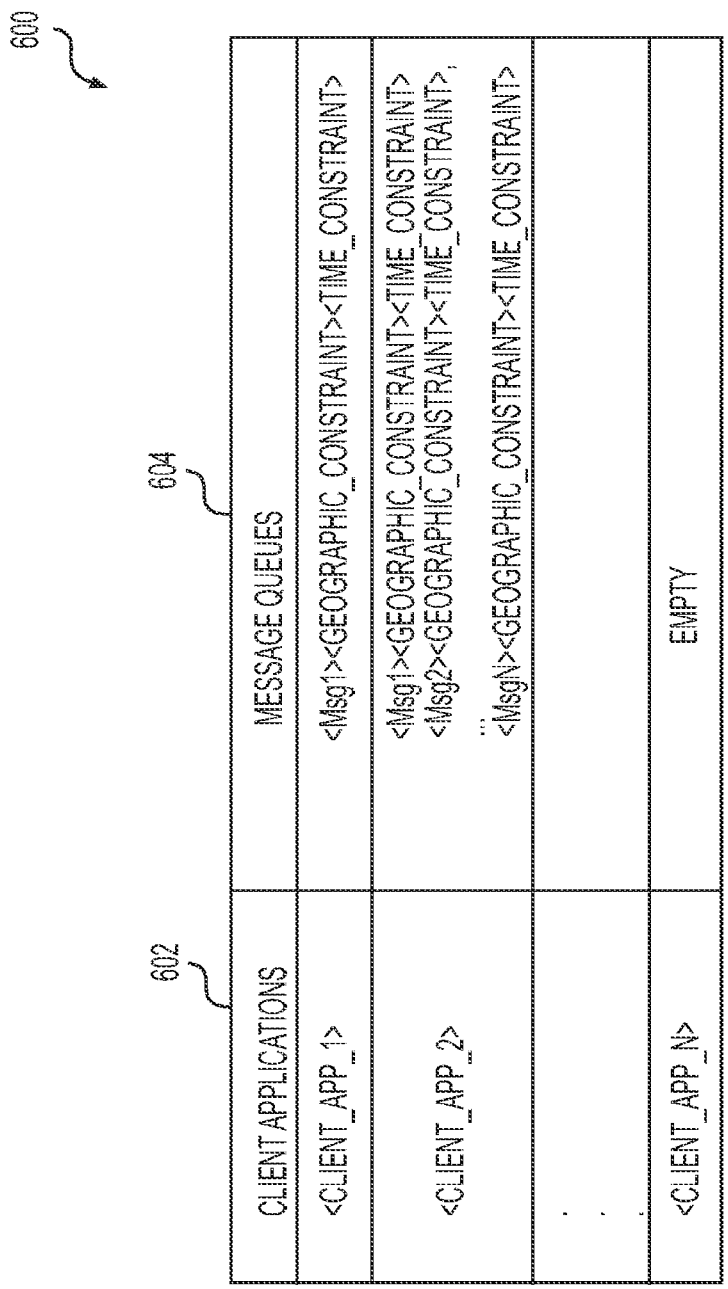
FIG. 6 is an exemplary table for associating different client applications with corresponding message queues.

It should be noted that step 510 may also include first checking the message queue to determine whether or not it includes any pending messages to be sent to the mobile device for the particular client application. The message queue in this example may be associated with the particular client application. In an example, an association between a queue of messages and a unique identifier associated with the client application may be maintained, e.g., by message server 240 of FIG. 2 or message server 340 of FIGS. 3 and 4, as described above. FIG. 6 shows an exemplary table 600 that may be used for associating different client applications, represented by corresponding client application identifiers 602 and their respective message queues 604. As shown in table 600, each message that is added to a message queue associated with a client application may include a time constraint used to determine a time that the message may be kept in the queue before being sent to the user's device or deleting the message from the queue, regardless of its current geographic location, as described above. Table 600 may be stored within a database (e.g., database 245 of FIG. 2) coupled to the server in this example.

However, if it is determined in step 508 that the current geographic location of the mobile device does not comply with the geographic constraint or the current time of the mobile device does not comply with the time constraint, method 500 may proceed to step 512. In step 512, the message with the geographic constraint and the time constraint is added to the appropriate message queue. Method 500 then proceeds to step 514, which includes waiting for a predetermined event to be triggered or the expiration time of the message to elapse. An example of such a predetermined event includes, but is not limited to, receiving a notification of an updated or detected change in current geographic location and/or current time for the mobile device.

The method 500 proceeds to step 516, which may include receiving a notification of an updated geographic location and/or time of the mobile device, e.g., a type of predetermined event trigger described above with respect to step 514, and proceeds to step 506. In an example, the aforementioned server may store an association between each of various client applications executable at the user's device and one or more geographic constraints and/or time constraints corresponding to each client application. Such information may be stored within a table, for example, table 600 of FIG. 6, as described above, along with the message queue and expiration time information.

Figure 7:
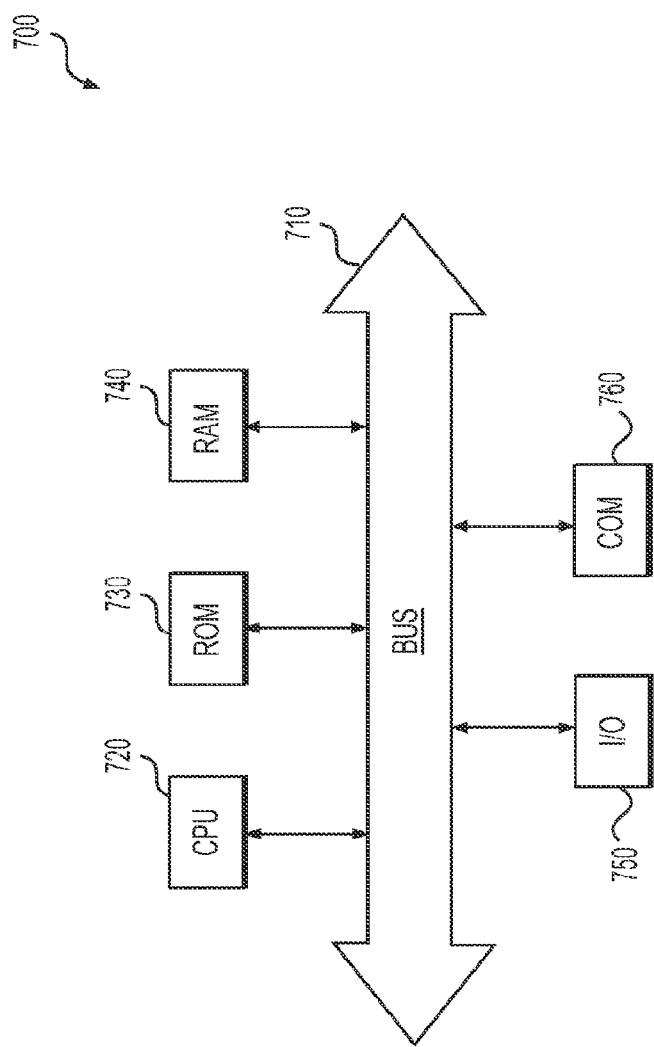
FIG. 7 is a block diagram of an exemplary computer system in which embodiments of the present disclosure may be implemented.

FIG. 7 provides a high-level functional block diagram illustrating an exemplary general purpose computer 700. Computer 700 may be used to implement, for example, any of application server 230 and message server 240 of FIG. 2 in addition to application server 330 and message server 340 of FIGS. 3 and 4, as described above. It is believed that those skilled in the art are familiar with the structure, programming and general operation of such computer equipment and as a result the drawings should be self-explanatory.

In an example, computer 700 may represent a computer hardware platform for a server or the like. Accordingly, computer 700 may include, for example, a data communication interface for packet data communication 760. The platform may also include a central processing unit (CPU) 720, in the form of one or more processors, for executing program instructions. The platform typically includes an internal communication bus 710, program storage and data storage for various data files to be processed and/or communicated by the platform such as ROM 730 and RAM 740, although the computer 700 often receives programming and data via network communications 770. The hardware elements, operating systems and programming languages of such equipment are conventional in nature, and it is presumed that those skilled in the art are adequately familiar therewith. Computer 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for optimizing delivery of messages to mobile device users, the method comprising:
   receiving a message to be sent to a client application executable at a mobile device of a user, along with an associated time constraint and an associated geographic constraint;
   determining a current time at the mobile device and a current geographic location of the mobile device via a communication network;
   determining, upon receiving the current geographic location of the mobile device and the current time of the mobile device, whether the current geographic location of the mobile device complies with the associated geographic constraint for the message to be sent to the client application and determining whether the current time of the mobile device complies with the associated time constraint for the message to be sent to the client application; and
   sending, when the current geographic location of the mobile device is determined to comply with the associated geographic constraint and when the current time of the mobile device is determined to comply with the associated time constraint, the message for display to the user at the mobile device via a message notification interface of an operating system of the mobile device,
   wherein the associated time constraint is based on an expiration time associated with the message that is added to a message queue, the expiration time being based on a priority level assigned to the message by an application service provider associated with the client application, such that the message is removed from the message queue when the expiration time elapses, and such that the message is sent to the mobile device for display to the user without being added to the message queue when the message is assigned a high priority level.

2. The method of claim 1, further comprising:
   adding, when at least one of the associated geographic constraint and the associated time constraint has been determined not to be complied with, the message to the message queue, wherein the added message is to be sent from the message queue for display to the user at the mobile device when a detected change in the current geographic location of the mobile device is determined to comply with the associated geographic constraint and the current time of the mobile device is determined to comply with the associated time constraint.

3. The method of claim 1, wherein the message, along with the associated time constraint and the associated geographic constraint, to be sent to the client application is from at least one of a member of a social network of the user of the mobile device and a contact of the user of the mobile device.

4. The method of claim 2, further comprising:
   determining, upon receiving an indication of an updated current time of the mobile device, whether or not the updated current time of the mobile device complies with the associated time constraint;
   determining, upon receiving an indication of an updated current geographic location of the mobile device, whether or not the updated current geographic location of the mobile device complies with the associated geographic constraint; and
   providing the message from the message queue to be displayed for the user within the message notification view when the updated current time of the mobile device is determined to comply with the associated time constraint and when the updated geographic location of the mobile device is determined to comply with the associated geographic constraint.

5. The method of claim 1, wherein the message is sent from the message queue for display to the user at the mobile device when the current geographic location of the mobile device is later determined to comply with the associated geographic constraint before the expiration time has elapsed or once the expiration time for the message is determined to have elapsed.

6. The method of claim 1, wherein the associated time constraint is at least one of a time being within a predetermined time period, the time being outside of the predetermined time period, the time being after a predetermined time, and the time being after a predetermined time.

7. The method of claim 1, wherein the associated geographic constraint is at least one of a geographic location inside of a predetermined geographic area, a geographic location outside of a predetermined geographic area, an entering of a predetermined geographic area, and an exiting of a predetermined geographic area.

8. A system for timing message notifications to optimize delivery of messages to mobile device users, the system comprising:
   a memory having processor-readable instructions stored therein; and
   a processor configured to access the memory and execute the processor-readable instructions, which when executed by the processor configures the processor to perform a plurality of functions, including functions to:
   receive a message to be sent to a client application executable at a mobile device of a user, along with an associated time constraint and an associated geographic constraint;
   determine a current time at the mobile device and a current geographic location of the mobile device via a communication network;
   determine, upon receiving the current geographic location of the mobile device and the current time of the mobile device, whether the current geographic location of the mobile device complies with the associated geographic constraint for the message to be sent to the client application and determining whether the current time of the mobile device complies with the associated time constraint for the message to be sent to the client application; and send, when the current geographic location of the mobile device is determined to comply with the associated geographic constraint and when the current time of the mobile device is determined to comply with the associated time constraint, the message for display to the user at the mobile device via a message notification interface of an operating system of the mobile device, wherein the associated time constraint is based on an expiration time associated with the message that is added to a message queue, the expiration time being based on a priority level assigned to the message by an application service provider associated with the client application, such that the message is removed from the message queue when the expiration time elapses, and such that the message is sent to the mobile device for display to the user without being added to the message queue when the message is assigned a high priority level.

9. The system of claim 8, wherein the processor is further configured to perform functions to:

add, when at least one of the associated geographic constraint and the associated time constraint has been determined not to be complied with, the message to the message queue, wherein the added message is to be sent from the message queue for display to the user at the mobile device when a detected change in the current geographic location of the mobile device is determined to comply with the associated geographic constraint and the current time of the mobile device is determined to comply with associated the time constraint.

10. The system of claim 9, wherein the processor is further configured to perform functions to:

determine, upon receiving an indication of an updated current time of the mobile device, whether or not the updated current time of the mobile device complies with the associated time constraint;

determine, upon receiving an indication of an updated current geographic location of the mobile device, whether or not the updated current geographic location of the mobile device complies with the associated geographic constraint; and provide the message from the message queue to be displayed for the user within the message notification view when the updated current time of the mobile device is determined to comply with the associated time constraint and when the updated geographic location of the mobile device is determined to comply with the associated geographic constraint.

11. The system of claim 8, wherein the message is sent from the message queue for display to the user at the mobile device when the current geographic location of the mobile device is later determined to comply with the associated geographic constraint before the expiration time has elapsed or once the expiration time for the message is determined to have elapsed.

12. The system of claim 8, wherein the associated time constraint is at least one of a time being within a predetermined time period, the time being outside of the predetermined time period, the time being after a predetermined time, and the time being after a predetermined time.

13. The system of claim 8, wherein the associated geographic constraint is at least one of a geographic location inside of a predetermined geographic area, a geographic location outside of a predetermined geographic area, an entering of a predetermined geographic area, and an exiting of a predetermined geographic area.

14. A non-transitory computer readable medium storing instructions that, when executed by a computer, cause the computer to perform functions to:

receive a message to be sent to a client application executable at a mobile device of a user, along with an associated time constraint and an associated geographic constraint;

determine a current time at the mobile device and a current geographic location of the mobile device via a communication network;

determine, upon receiving the current geographic location of the mobile device and the current time of the mobile device, whether the current geographic location of the mobile device complies with the associated geographic constraint for the message to be sent to the client application and determining whether the current time of the mobile device complies with the associated time constraint for the message to be sent to the client application; and send, when the current geographic location of the mobile device is determined to comply with the associated geographic constraint and when the current time of the mobile device is determined to comply with the associated time constraint, the message for display to the user at the mobile device via a message notification interface of an operating system of the mobile device, wherein the associated time constraint is based on an expiration time associated with the message that is added to a message queue, the expiration time being based on a priority level assigned to the message by an application service provider associated with the client application, such that the message is removed from the message queue when the expiration time elapses, and such that the message is sent to the mobile device for display to the user without being added to the message queue when the message is assigned a high priority level.

15. The non-transitory computer readable medium of claim 14, wherein the computer is further configured to perform functions to:

add, when at least one of the associated geographic constraint and the associated time constraint has been determined not to be complied with, the message to the message queue, wherein the added message is to be sent from the message queue for display to the user at the mobile device when a detected change in the current geographic location of the mobile device is determined to comply with the associated geographic constraint and the current time of the mobile device is determined to comply with the associated time constraint.

16. The non-transitory computer readable medium of claim 15, wherein the computer is further configured to perform functions to:

determine, upon receiving an indication of an updated current time of the mobile device, whether or not the updated current time of the mobile device complies with the associated time constraint;

determine, upon receiving an indication of an updated current geographic location of the mobile device, whether or not the updated current geographic location of the mobile device complies with the associated geographic constraint; and provide the message from the message queue to be displayed for the user within the message notification view when the updated current time of the mobile device is determined to comply with the associated time constraint and when the updated geographic location of the mobile device is determined to comply with the associated geographic constraint.

17. The non-transitory computer readable medium of claim 14, wherein the associated time constraint is at least one of a time being within a predetermined time period, the time being outside of the predetermined time period, the time being after a predetermined time, and the time being after a predetermined time.

18. The non-transitory computer readable medium of claim 14, wherein the associated geographic constraint is at least one of a geographic location inside of a predetermined geographic area, a geographic location outside of a predetermined geographic area, an entering of a predetermined geographic area, and an exiting of a predetermined geographic area.

19. The non-transitory computer readable medium of claim 14, wherein the message, along with the associated time constraint and the associated geographic constraint, to be sent to the client application is from at least one of a member of a social network of the user of the mobile device and a contact of the user of the mobile device.

20. The non-transitory computer readable medium of claim 14, wherein the message is sent from the message queue for display to the user at the mobile device when the current geographic location of the mobile device is later determined to comply with the associated geographic constraint before the expiration time has elapsed or once the expiration time for the message is determined to have elapsed.

* * * * *